United States Patent
Rutkowski

[11] 3,767,292
[45] Oct. 23, 1973

[54] ALIGNING DEVICE FOR TRACTOR HITCHES

[76] Inventor: Phillip R. Rutkowski, Battle Creek, Mich.

[22] Filed: Oct. 16, 1972

[21] Appl. No.: 297,984

[52] U.S. Cl.................. 350/293, 301/37, 248/488, 350/307
[51] Int. Cl. ............................................ G02b 5/10
[58] Field of Search.................... 350/288, 293–296, 350/303, 304, 307; 248/476–478, 488; 301/37

[56] References Cited
UNITED STATES PATENTS
3,639,036  2/1972  Rosebach.............................. 350/97
3,295,914  1/1967  Dietrich.............................. 350/307

Primary Examiner—David Schonberg
Assistant Examiner—Michael J. Tokar
Attorney—Roy A. Plant et al.

[57] ABSTRACT

A device is provided for assisting an operator in backing up a trailer-towing or tractor vehicle to couple a ball hitch member mounted on the rear of the vehicle with the complementary socket hitch member mounted on the tongue of the trailer. The device comprises a bracket adapted to be mounted on the trailer, and particularly on the vertical bolt utilized for clamping the bottles of cooking and heating gas, and provided at one end with means such as a clamp adapted to engage and support a large size hubcap having a convex reflecting surface. The hubcap serves as a convex mirror and provides an excellent image of both hitch members for enabling the operator to steer the tractor vehicle in the proper direction, and provides a precise indication when the socket member is superposed over the ball member.

7 Claims, 10 Drawing Figures

ALIGNING DEVICE FOR TRACTOR HITCHES

BACKGROUND OF THE INVENTION

The present invention relates to vehicle-guiding devices, and is more particularly concerned with such a device which may be utilized in assisting the operator of a tractor vehicle in coupling the hitch member of the vehicle to the complementary hitch member of the trailer.

The connecting of the ball and socket joint of the hitch between a towing or tractor vehicle and a trailer, such as a house trailer or a travel trailer, is always a difficult procedure, normally requiring the attention of two people, one to operate the towing vehicle, as for example an automobile, and the other one to stand near the hitch to indicate to the driver which way he should maneuver the front wheels of the towing vehicle in order to move the ball and socket members toward each other, and when to stop the vehicle as the hitch members come into superposition. When such an additional person is not available, the problems of the operator increase appreciably, and a considerable amount of back and forth maneuvering is generally necessary before the components of the hitch are properly aligned and superposed for proper coupling. Alignment devices utilizing small mirrors and particularly a convex mirror have been disclosed for assisting the towing vehicle operator in alignment procedure. However, because of the high cost, such mirrors have been necessarily small and difficult to manufacture and utilize.

SUMMARY OF THE INVENTION

Accordingly, it is an object of the present invention to provide a guide means for assisting the operator of a towing or tractor vehicle in maneuvering the vehicle in order to place the respective hitch members of the towing vehicle and the trailer to which it is to be connected in proper alignment for connection.

It is another object of the invention to provide a device of the type described which is self-contained, readily portable, and which may be easily and quickly mounted on the trailer, and then readily removed after coupling has been accomplished.

It is still another object of the invention to provide a trailer hitch aligning guide which may be utilized by the operator alone without the need for assistance by another person in aligning the hitch members.

It is still another object of the invention to provide a hitch aligning device which provides the operator with an image of the ball and socket of the hitch of such nature that he can readily discern when the two are in superposition.

It is still further an object to provide a device of the type described which is simple to produce and relatively inexpensive in that it utilizes readily available structures which are staples in the auto accessory industry.

Still further objects and advantages of the invention will appear as the description proceeds.

To the accomplishment of the foregoing and related ends, the invention, then, consists of a useful alignment guide for trailer hitches herein fully described and particularly pointed out in the claims, the annexed drawings, and the following description setting forth in detail certain illustrative embodiments of the invention, such disclosed embodiments illustrating, however, several of the various ways in which the principle of the invention may be utilized.

DESCRIPTION OF THE SPECIFIC EMBODIMENTS

Figure 1:
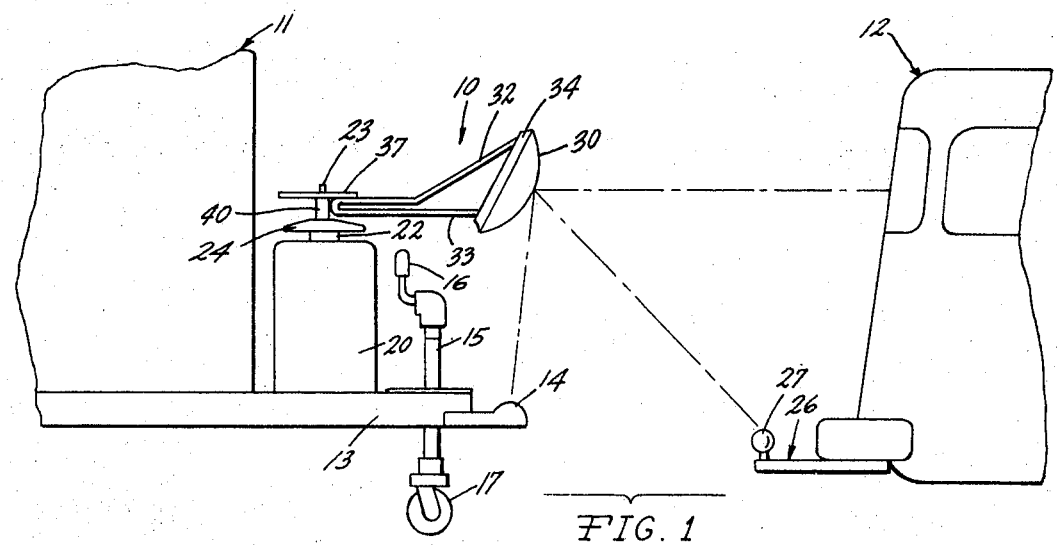
FIG. 1 is a side elevation view of the invention mounted on a trailer and showing the relationship of the trailer and towing vehicle.
Figure 6:
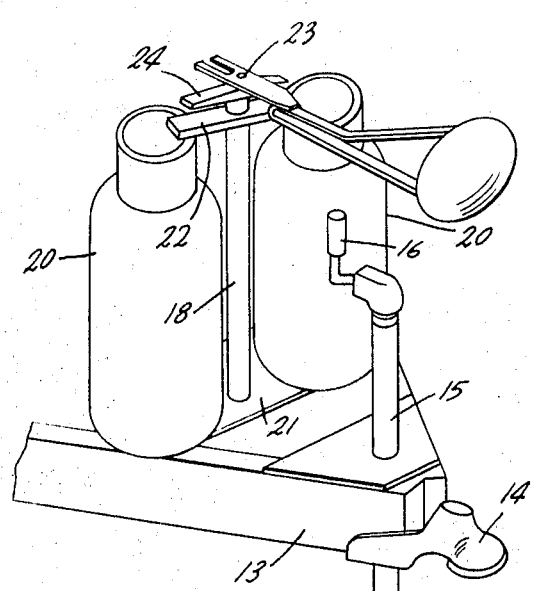
FIG. 6 is a fragmentary perspective view of the front of the trailer showing an aligning device according to the invention mounted thereon.

Referring to FIG. 1, the aligning device 10 of the invention is shown mounted on a trailer 11 and positioned to be observed by the operator of a motor vehicle 12 which is to serve as a tractor vehicle. The trailer is provided with a tongue or drawbar 13 having a socket member 14 mounted thereon. Additionally provided on the drawbar 13 is a jack 15 having a crank 16 and wheel 17 (FIG. 6). The trailer 11 also has a pair of LPG (liquid propane gas) or bottle gas tanks 20 mounted on a support 21 and affixed by means of a hold-down bracket 22 disposed over a vertical bolt 23 mounted on a hold-down post 18 affixed at one end to the support 21, and a wing nut 24, as shown in detail in FIG. 6. As shown in FIG. 1, the tractor vehicle 12 is provided with a hitch 26 having a ball member 27 mounted thereon and adapted to be engaged by the socket member 14.

Figure 3:
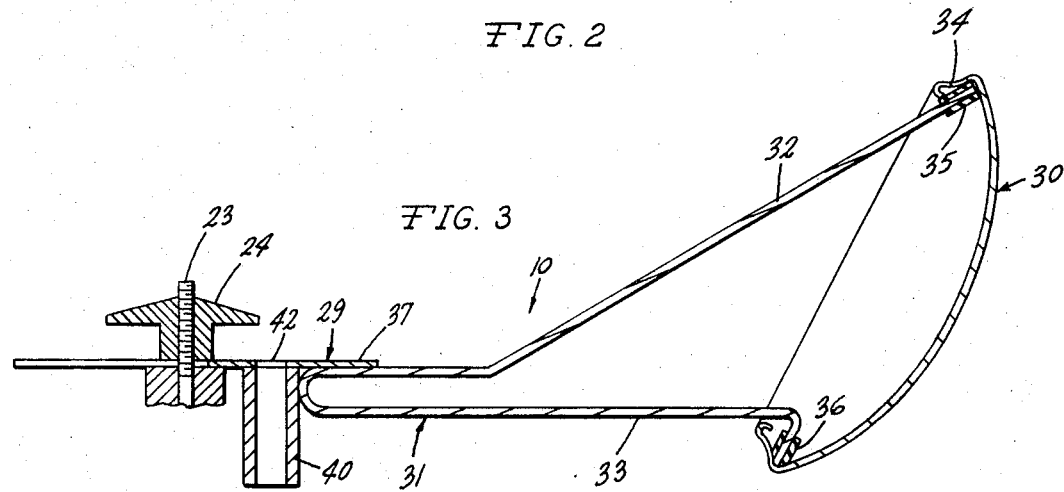
FIG. 3 is a sectional view taken at the line III—III of FIG. 2, looking in the direction of the arrows.

The aligning device 10 of the invention comprises a supporting member or bracket 29 and a hubcap reflector member 30. The supporting member or bracket 29 has a spring member 31 formed of strap spring steel or any other suitable material such as plastic, having a pair of arms 32 and 33 biased apart from each other. In this embodiment the U-form of the spring member is somewhat flattened so that it is only about 1 inch wide. This permits the wing nut 24 to rotate clear of the bracket. Additionally, the narrow form is easier to grasp with the hand for compressing in order to engage the hubcap flange. The reflector member 30 is a standard convex hubcap in the form of a spherical sector and is provided with an involute lip 34. A pair of tips 35 and 36 of a material such as rubber or plastic may be mounted on the ends of the arms 32 and 33 to assist in securing the hubcap 30. A support plate 37 is affixed to the spring member 31 at the upper portion thereof by suitable means such as welding. The support 37 is provided with a slot 38 for mounting over the hold-down bolt 23 and for being clamped in place by the wing nut 24 as shown in FIG. 3. The support plate 37 is also provided with a tubular sleeve 40 affixed thereto and having an aperture 42 for alternative mounting over the hold-down bolt 23, as shown in FIG. 1, where a long bolt is available. Additionally, pressed ridges 39 are provided in the support plate 37 to impart rigidity.

To assemble the aligning device of the invention, the spring member 31 is grasped and the arms 32 and 33 compressed together. The hubcap 30 is then placed over the ends of the arms. When the arms are released, the resulting spring force securely retains the hubcap 30. If the bolt 23 of the hold-down post extends a sufficient distance above the wing nut 24, the tubular sleeve 40 may be mounted over the bolt 23. In the case of travel trailers having a short bolt 23, the wing nut 24 is loosened and the fork-shaped support plate 37 inserted below the wing nut with the bolt 23 disposed in the slot 38, and then the wing nut 24 is tightened. The aligning device is positioned so that the reflective surface of the hubcap 30 is disposed substantially above the socket 14. The reflective surface of the hubcap then provides a complete view to the operator in the tractor vehicle of the socket member 14 and also of the ball member 27. The operator maneuvers the vehicle by aiming the image of the ball member at the image of the socket member. The operator continues to back the tractor vehicle toward the trailer until the ball member just disappears from view, indicating that the socket member is superposed over the ball member. The operator can then dismount from the tractor vehicle and lower the jack 15 to couple the socket member and ball member. The operation can be precisely performed by the operator without the assistance and direction of a second person standing by the trailer. After only one or two practice attempts, the operator can subsequently invariably complete the coupling each time without any external assistance.

Figures 4, 5:
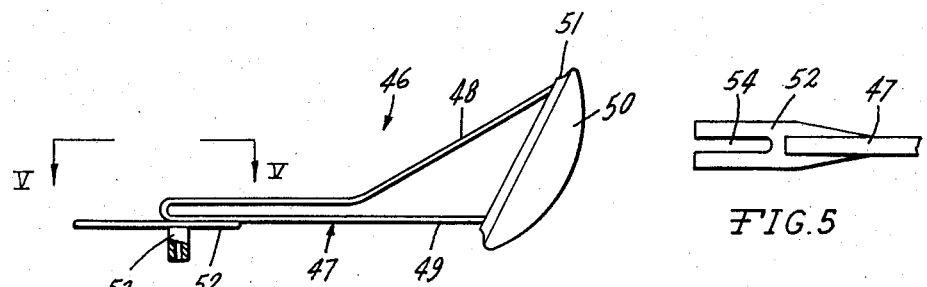
FIG. 4 is a side elevational view of another embodiment of the invention.
FIG. 5 is a fragmentary view taken at the line V—V of FIG. 4, looking in the direction of the arrows.

Referring to FIGS. 4 and 5, another embodiment of the invention is shown comprising a modified aligning device 46 having a spring member 47 with arms 48 and 49 and engaging a hubcap 50 having an involute lip 51. The aligning device has a support plate 52 welded to the bottom of the spring member 47. The support plate is provided with a tubular collar 53 affixed thereto for mounting over the end of the bolt of a vertical post, and with a slot 54 provided in the plate 52 for alternatively engaging the bolt and being tightened to the structure by means of a wing nut such as that designated by the numeral 24 in FIG. 3.

Figure 7:
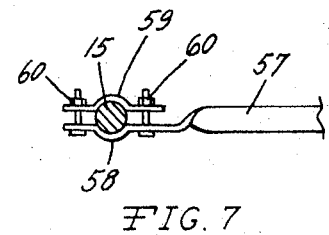
FIG. 7 is a fragmentary view partly in cross-section showing a modified embodiment of the invention.

Referring to FIG. 7, a portion of a support plate 57 is shown having a clamp member 58 formed at one end and cooperating with a complementary clamp member 59 and a pair of bolts and nuts 60 for mounting over the jack post 15 (FIG. 6) or alternatively the hold-down post 18. The remainder of the aligning device is similar to that shown in FIGS. 1-3 and 6.

Figure 2:
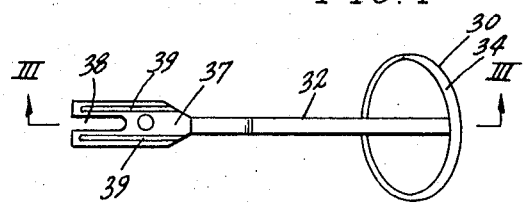
FIG. 2 is a top view of the device shown mounted in FIG. 1.
Figure 8:
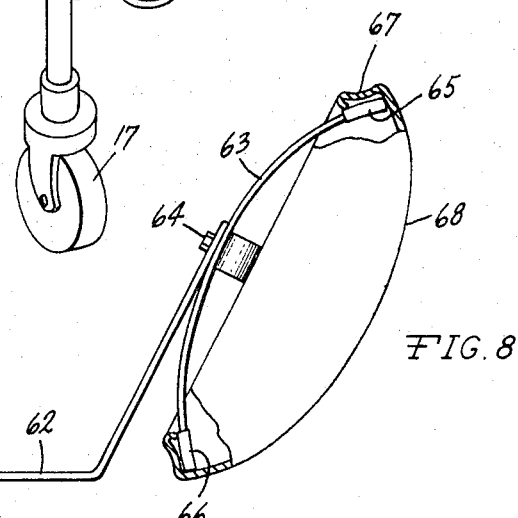
FIG. 8 is a fragmentary side view partly in cross-section showing another embodiment of the invention.

FIG. 8 illustrates an aligning device having a support bracket 62 which may terminate with a tubular collar and forked plate similar to that shown in FIGS. 1-3. A spring member 63 is affixed to the support bracket by means of a bolt 64 and is provided at its ends with protective tips 65 and 66 engaging the involute flange 67 of a convex hubcap 68.

Figure 9:
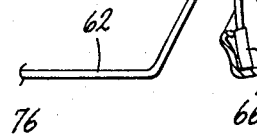
FIG. 9 is a fragmentary side view partly in cross-section showing a further embodiment.
Figure 9:
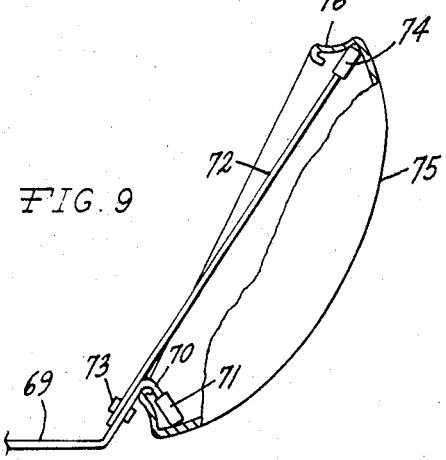

FIG. 9 illustrates still another embodiment having a support member 69 having an acutely angled arm 70 with a protective tip 71 thereon. An extension arm 72 is affixed to the support member 69 by a bolt and nut combination 73. The extension arm 72 has a protective tip 74 at its remote end. A hubcap reflector 75 having an involute flange 76 is supported by the angled arm 70 and extension arm 72. The hubcap is mounted by loosening the bolt and nut combination 73. At least one of the arms 70 or 72 is provided with an elongated slot to permit relative adjustment between the two arms. The ends of the arms are placed within the involute flange 76 and spread apart to engage the hubcap firmly, and the nut and bolt combination 73 then retightened.

Figure 10:
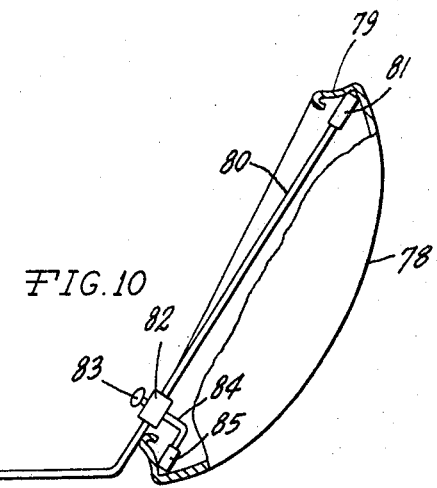
FIG. 10 is a fragmentary side view partly in cross-section showing an additional embodiment.

FIG. 10 illustrates an embodiment similar to that shown in FIG. 9 utilizing a hubcap 78 having an involute flange 79. An extension arm 80 has a protective tip 81 at one end engaging the involute flange. The other end of the extension arm 80 may be affixed to or integral with a support plate or tubular collar such as shown in FIGS. 1-3, or by any other means suitable for mounting on the trailer. A tubular collar 82 is slidably mounted on the extension arm 80 and affixed at any desired position by a thumb screw 83. Also affixed to the collar 82 is a right-angled arm 84 having a protective tip 85 mounted on the end thereof. In mounting the hubcap 78, the thumbscrew 83 is loosened and the collar 82 slid upwardly. The end of the extension arm 80 is inserted below the involute flange 79 abutting with the periphery of the spherical portion of the hubcap. The collar 82 is then moved downwardly along the rod 80 until the protective tip 85 engages the lower portion of the involute flange. The thumbscrew 83 is then tightened, thereby securely clamping the hubcap in place.

The aligning device of the invention in any of the embodiments shown and described may be assembled as described and mounted on a trailer. The device is then utilized as described in connection with FIGS. 1-3 to back the tractor vehicle by aiming the image of the ball member at the socket member to the proper point in which the socket member and ball member are superposed, as evidenced by the disappearance of the ball member.

The aligning device of the present invention has many advantages over prior art devices developed for the same purpose. First, the use of a large convex reflective surface such as provided by a hubcap gives the operator an excellent view of the hitch members so that he can back the tractor vehicle in the proper direction without assistance from another person standing by the hitch. Second, the mirror surface provides an excellent view to the operator to indicate when the socket member and ball member are superposed. Additionally, the device may be readily disassembled by disengaging the clamp and removing the reflector, and may be readily stored. Finally, the entire device may be very easily provided since the clamp portion may be readily and inexpensively built from easily available inexpensive materials, and the hubcap which provides an exceptionally large convex reflective surface is readily available on the market, whereas, to provide a convex mirror manufactured of glass in the size of a large hubcap would be exorbitantly expensive.

While only several forms of the invention have been shown and described, other forms within the spirit and scope of the invention will now be apparent to those skilled in the art. Therefore, the embodiments shown in the drawings are to be considered as merely setting forth the invention for illustrative purposes, and are not intended to limit the scope of the invention herein described, shown and claimed.

The embodiments of the invention in which an exclusive property or privilege is claimed are defined as follows:

1. An aligning device for assisting in coupling a trailer hitch member mounted on a tractor vehicle with a complementary trailer hitch member mounted on a trailer vehicle, said aligning device comprising in combination a supporting bracket and an automobile hubcap having a convex reflective surface, said bracket having means at one end for mounting on said trailer vehicle and means at the other end engaging and supporting said hubcap.

2. An aligning device according to claim 1, wherein said means for mounting said bracket on said trailer vehicle comprises a tubular sleeve adapted to mount over a vertical bolt provided on said trailer vehicle for holding down liquid propane gas tanks.

3. An aligning device according to claim 1, wherein said means for mounting said bracket on said trailer vehicle comprises a plate having a slot therein adapted to receive a vertical bolt mounted on said trailer vehicle for holding down liquid propane gas tanks, and to be clamped in place by a nut threadedly engaging said bolt.

4. An aligning device according to claim 1, wherein said means for mounting said bracket on said trailer vehicle comprises a clamp adapted to engage a vertical jack pillar mounted on said trailer vehicle.

5. An aligning device according to claim 1, wherein said means engaging and supporting said hubcap comprises a spring member having ends spring biased apart positioned within an involute flange provided on said hubcap.

6. An aligning device according to claim 5, wherein protective tips are provided at the ends of said spring member.

7. An aligning device according to claim 1, wherein said means engaging and supporting said hubcap comprises two arms adjustably affixed with respect to each other having their ends engaging an involute flange provided on said hubcap.

* * * * *